(12) United States Patent
Witte

(10) Patent No.: US 10,526,004 B2
(45) Date of Patent: Jan. 7, 2020

(54) DEVICE FOR ASSISTING OR AUTOMATIC GUIDING OF A MOTOR VEHICLE

(71) Applicant: VOLKSWAGEN AG, Wolfsburg (DE)

(72) Inventor: Bastian Witte, Gross Schwülper (DE)

(73) Assignee: Volkswagen AG (DE)

( * ) Notice: Subject to any disclaimer, the term of this patent is extended or adjusted under 35 U.S.C. 154(b) by 449 days.

(21) Appl. No.: 14/439,519

(22) PCT Filed: Oct. 15, 2013

(86) PCT No.: PCT/EP2013/071513
§ 371 (c)(1),
(2) Date: Apr. 29, 2015

(87) PCT Pub. No.: WO2014/067773
PCT Pub. Date: May 8, 2014

(65) Prior Publication Data
US 2015/0298722 A1    Oct. 22, 2015

(30) Foreign Application Priority Data

Oct. 30, 2012 (DE) .................. 10 2012 021 436

(51) Int. Cl.
*B62D 5/00* (2006.01)
*B62D 5/04* (2006.01)

(52) U.S. Cl.
CPC .......... *B62D 5/003* (2013.01); *B62D 5/0421* (2013.01)

(58) Field of Classification Search
CPC ........ B62D 5/003; B62D 5/04; B62D 5/0448; B62D 5/0445; B62D 5/0451; B62D 5/0454

USPC ......................................... 180/407
See application file for complete search history.

(56) References Cited

U.S. PATENT DOCUMENTS

| 4,577,738 | A | * | 3/1986 | Yater ................ F16D 67/04 192/18 A |
| 4,681,183 | A | * | 7/1987 | Oshita ................ B62D 5/0466 180/446 |
| 5,327,986 | A | | 7/1994 | Saita |
| 6,394,218 | B1 | * | 5/2002 | Heitzer ................ B62D 5/003 180/402 |

(Continued)

FOREIGN PATENT DOCUMENTS

| DE | 69213363 T2 | 1/1997 |
| DE | 19902556 A1 | 7/2000 |

(Continued)

OTHER PUBLICATIONS

Search Report for German Patent Application No. 10 2012 021 436.7; dated Jun. 7, 2013.

(Continued)

*Primary Examiner* — Joseph M Rocca
*Assistant Examiner* — Conan D Duda
(74) *Attorney, Agent, or Firm* — Barnes & Thornburg LLP

(57) ABSTRACT

A device for assisting or automatic guiding of a motor vehicle, having a first steering actuator with an allocated steering control unit, a gear rack, a steering column and a steering handle, wherein the steering column and the steering actuator have effect on the common gear rack, wherein there is at least one second steering actuator having an additional allocated steering control unit, wherein the second steering actuator has effect on the common gear rack.

18 Claims, 12 Drawing Sheets

(56) References Cited

U.S. PATENT DOCUMENTS

| | | | | |
|---|---|---|---|---|
| 6,543,569 B1* | 4/2003 | Shimizu | B21K 1/767 | 180/444 |
| 7,222,008 B2* | 5/2007 | Takahashi | B62D 5/003 | 180/443 |
| 7,686,125 B2* | 3/2010 | Andersson | B62D 5/0427 | 180/407 |
| 7,789,784 B2* | 9/2010 | Hayashi | B62D 5/008 | 475/18 |
| 9,079,604 B2* | 7/2015 | Di Giusto | B62D 7/09 | |
| 9,272,727 B2* | 3/2016 | Kometani | B62D 3/123 | |
| 2002/0063012 A1* | 5/2002 | Katou | B62D 3/12 | 180/427 |
| 2003/0051938 A1* | 3/2003 | Menjak | B62D 5/008 | 180/444 |
| 2003/0221895 A1* | 12/2003 | Palakodati | B62D 3/126 | 180/443 |
| 2004/0007416 A1* | 1/2004 | Furumi | B62D 5/04 | 180/443 |
| 2004/0026158 A1 | 2/2004 | Rieth et al. | | |
| 2005/0072621 A1* | 4/2005 | Hara | B62D 1/163 | 180/444 |
| 2005/0234614 A1* | 10/2005 | Sakurai | B62D 5/049 | 701/33.7 |
| 2005/0257992 A1 | 11/2005 | Shiino et al. | | |
| 2006/0054378 A1* | 3/2006 | Tanaka | B62D 5/0424 | 180/444 |
| 2006/0055139 A1* | 3/2006 | Furumi | B62D 5/04 | 280/93.513 |
| 2006/0144636 A1* | 7/2006 | Beutler | B62D 3/12 | 180/443 |
| 2007/0198152 A1* | 8/2007 | Endo | B62D 15/0285 | 701/41 |
| 2008/0011537 A1* | 1/2008 | Ozsoylu | B62D 5/04 | 180/422 |
| 2008/0035411 A1* | 2/2008 | Yamashita | B62D 5/046 | 180/443 |
| 2008/0059034 A1* | 3/2008 | Lu | B60T 8/17552 | 701/71 |
| 2008/0091320 A1* | 4/2008 | Sakai | B62D 1/286 | 701/42 |
| 2008/0208366 A1* | 8/2008 | Dalby | F15B 13/0867 | 700/3 |
| 2008/0244029 A1* | 10/2008 | Soga | G06F 11/0742 | 709/209 |
| 2009/0242219 A1* | 10/2009 | Dunn | A01L 369/008 | 172/2 |
| 2009/0260468 A1* | 10/2009 | Tachikake | B62D 3/02 | 74/424.82 |
| 2010/0030426 A1* | 2/2010 | Okita | B60T 7/22 | 701/41 |
| 2010/0235053 A1* | 9/2010 | Iwakiri | B62D 15/027 | 701/42 |
| 2010/0286872 A1* | 11/2010 | Endo | B62D 7/159 | 701/41 |
| 2011/0127742 A1* | 6/2011 | Bae | B62D 5/0448 | 280/93.513 |
| 2012/0046832 A1* | 2/2012 | Kariatsumari | B62D 5/046 | 701/41 |
| 2012/0181102 A1* | 7/2012 | Bando | B62D 5/0448 | 180/444 |
| 2012/0239252 A1* | 9/2012 | Sawada | B62D 15/0265 | 701/41 |
| 2012/0241244 A1* | 9/2012 | Escobedo | B62D 3/08 | 180/444 |
| 2012/0265405 A1* | 10/2012 | Matsumura | B60W 50/0225 | 701/45 |
| 2012/0298439 A1* | 11/2012 | Ji | B62D 5/0403 | 180/443 |
| 2013/0173832 A1* | 7/2013 | Calvin | G06F 13/4022 | 710/110 |
| 2013/0297150 A1* | 11/2013 | Kim | B62D 6/00 | 701/41 |
| 2014/0214277 A1* | 7/2014 | Brenner | B62D 5/0484 | 701/41 |
| 2017/0373821 A1* | 12/2017 | Arakawa | H04L 7/0008 | |

FOREIGN PATENT DOCUMENTS

| | | |
|---|---|---|
| DE | 19947265 A1 | 7/2000 |
| DE | 10039170 A1 | 6/2001 |
| DE | 10160716 A1 | 6/2003 |
| DE | 202004003949 U1 | 6/2004 |
| DE | 102004033686 A1 | 2/2006 |
| DE | 60312350 T2 | 7/2007 |
| DE | 102008008182 A1 | 10/2009 |
| DE | 102011055820 A1 | 6/2012 |
| EP | 1375300 A2 | 1/2004 |

OTHER PUBLICATIONS

Search Report for International Patent Application No. PCT/EP2013/071513; dated May 8, 2014.

* cited by examiner

DEVICE FOR ASSISTING OR AUTOMATIC GUIDING OF A MOTOR VEHICLE

PRIORITY CLAIM

This patent application is a U.S. National Phase of International Patent Application No. PCT/EP2013/071513, filed 15 Oct. 2013, which claims priority to German Patent Application No. 10 2012 021 436.7, filed 30 Oct. 2012, the disclosures of which are incorporated herein by reference in their entirety.

SUMMARY

Illustrative embodiments relate to a device for assisting or automatic guiding of a motor vehicle.

BRIEF DESCRIPTION OF THE DRAWINGS

The invention is explained in more detail below on the basis of exemplary embodiments. In the figures.

DETAILED DESCRIPTION OF THE DISCLOSED EMBODIMENTS

Figure 1:
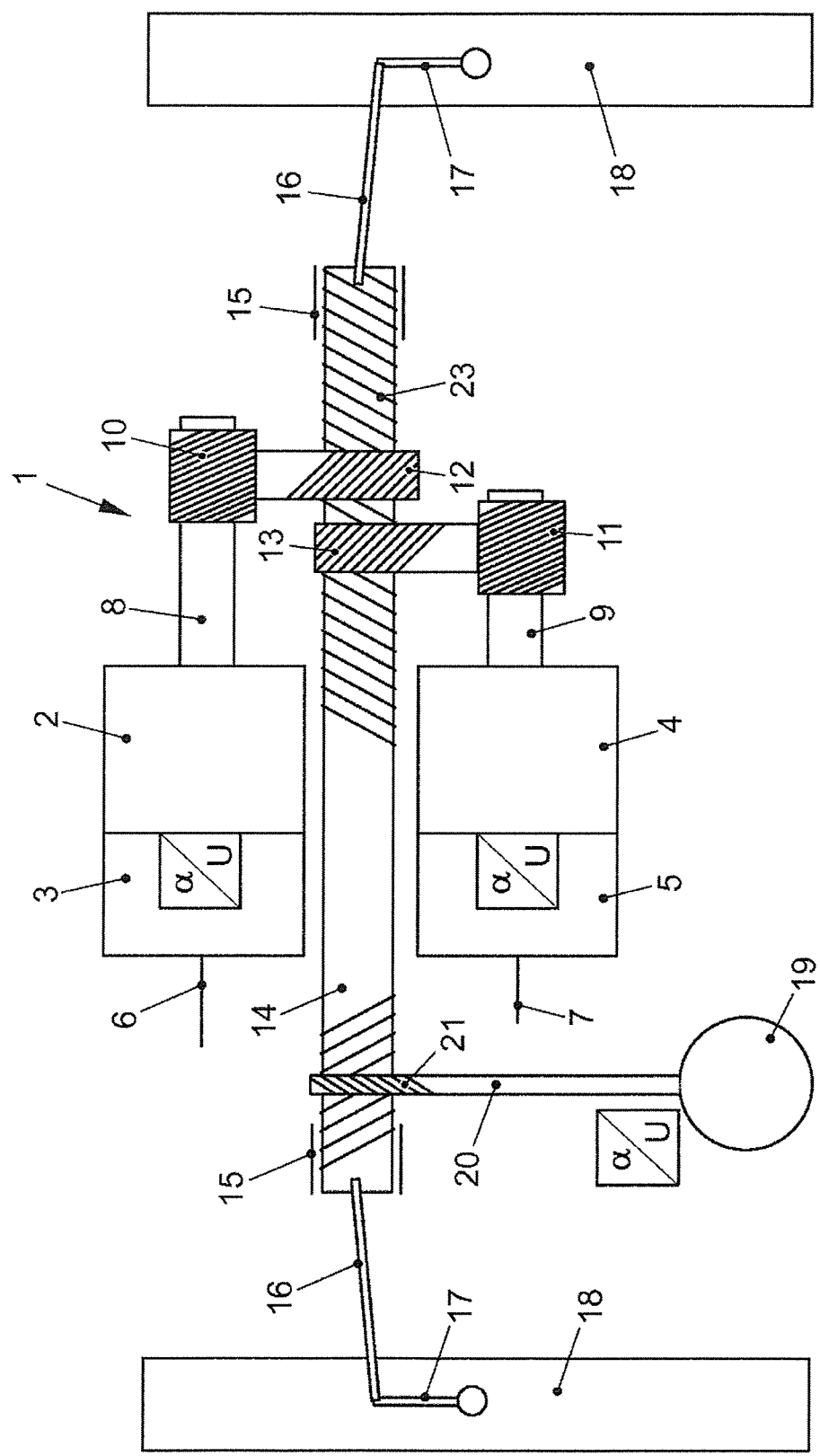
FIG. 1 shows an electromechanical steering with separate steering pinions for the servomotors.

Driver assistance systems are increasingly being used to help a vehicle driver guide a motor vehicle. The increase in such systems takes the form of partially, highly or fully automatic guiding of a motor vehicle, where the driver of the motor vehicle does not perform any steering or braking actions but instead the motor vehicle drives automatically. This gives rise to the problem that, when switching back from automatic guiding of the motor vehicle to driver-guided driving, the driver of the motor vehicle requires a certain amount of time to resume full control. In particular, individual faults should therefore not lead to the system being abruptly switched off. On the other hand, expenditure on additional parts should not be increased unnecessarily.

The illustrative embodiments address the technical problem of providing a device for assisting or automatic guiding of a motor vehicle in which the automatic or assisting steering movement is ensured more dependably.

For this purpose, the device for assisting or automatic guiding of a motor vehicle comprises a first steering actuator with an assigned steering control unit, a gear rack, a steering column and a steering handle, the steering column and the steering actuator having an effect on the common gear rack, wherein there is at least a second steering actuator with a further assigned steering control unit, the second steering actuator having an effect on the common gear rack.

Disclosed embodiments are based on the fact that conventional steering systems are formed with only a single mechanical circuit, i.e. there is only one steering handle, one steering column and one steering gear and, moreover, the two wheels on the right and left are mechanically connected to one another in a fixed manner by way of the steering lever arms of the swivel bearings, the track rods and the gear rack. It is assumed here that by providing adequate dimensioning, using metallic or similar materials for production and conducting adequate tests on test benches or during driving operation, redundancy of these mechanical components becomes unnecessary. Therefore, only the steering actuator with its assigned steering control unit is redundantly formed, but not the gear rack, the steering handle and the steering column. Optionally, the respective steering actuator is also assigned sensors of its own for sensing actual values. In this case, the two steering control units receive their setpoint values through a higher-level control unit for assisting or automatic guiding of a motor vehicle, wherein the data connection between the higher-level control unit and the steering control units may take place by way of separate bus systems, so that here too there is a redundancy to compensate for single faults. Again, the two steering control units may be directly connected to one another by way of a further bus system, so that if there is a fault of one bus system, the steering control unit assigned to the bus system can receive its setpoint values by way of the other bus system and the further bus system and can transmit its actual values to the higher-level control unit by way of the further bus system and the other bus system.

In a further disclosed embodiment, the two steering actuators are formed as electrical servomotors which are connected to electrical energy supply units that are independent of one another. For example, the two energy supply units are formed as batteries which are connected to a common generator or a common high-voltage battery by way of diodes, the diodes preventing a return effect. Instead of the diodes, other components that ensure a directed current flow may also be used.

Optionally, the two servomotors are identically formed, wherein the two servomotors can be put into operation in parallel or one after the other. For example, the two servomotors are designed for a maximum torque of 3 Nm. With only one servomotor, it is possible in the event of a fault to continue steering during driving with reduced maximum dynamics. Only during parking when stationary, when the greatest torques are required, is the individual servomotor unable to cope. Indeed, until now the driver has usually resumed control. Automatically parking vehicles on the other hand simply remain stationary. In any event, a single fault of a servomotor does not lead to a critical situation.

Optionally, the two servomotors are formed as brushless servomotors. This provides advantages in terms of durability, since there are no longer any brushes that undergo wear. The two servomotors may be formed as direct-current, rotary-current or alternating-current motors, in at least one disclosed embodiment one servomotor being formed as a synchronous motor and the other servomotor being formed as an asynchronous motor.

For commutating the two servomotors, there are necessarily two angle sensors or resolvers. Since the motor angle is then redundantly available, a separate steering wheel angle sensor of an electronic stability program can be replaced. Optionally, the two servomotors are fitted in such a way that they are slightly rotated in relation to one another. Each electric motor has, depending on its number of poles and the magnetic design, so-called cogging torques. When the rotor is released, it moves into a position where the cogging torque is at a maximum. The slightly rotated arrangement of the servomotors allows the number of cogging points to be doubled, and the cogging torques become less. This allows a more uniform torque profile to be achieved.

The connection of the two servomotors can in this case be performed in various ways, components that have been found from experience in the field with electrical power-assisted steering systems to have no probability of failure or only an extremely small probability also may be fitted only singly.

In at least one disclosed embodiment, the two electrical servomotors are connected to the common gear rack by way of a steering pinion of their own in each case. The two steering pinions of the two servomotors may be fitted closely to one another, so that the toothing only has to be extended slightly.

In another disclosed embodiment, the two servomotors are connected to the gear rack by way of a common steering pinion, whereby one steering pinion is saved and the toothing of the gear rack does not have to be extended. This also can be realized by various disclosed embodiments.

In at least one disclosed embodiment, the two servomotors act on different sides of the common steering pinion.

In another disclosed embodiment, the two servomotors are seated on a common shaft.

In a further disclosed embodiment, the shafts of the servomotors are connected to a steering pinion by a common driver, the steering pinion being connected to the gear rack.

In a further disclosed embodiment, the two servomotors are connected to the gear rack by way of a recirculating ball gear with a belt drive. This disclosed embodiment may be used in the case of axially parallel steering systems; again the belt drive may be doubled. In this case, the nut of the recirculating ball gear is designed to be wider, so that two belt drives can circulate, a belt drive being respectively connected to a servomotor. For the symmetrical loading of the recirculating ball gear, one of the two belts may also be divided into two narrow belts, which are then arranged on the outside of the recirculating ball gear and are connected to a servomotor, while a wider belt that is connected to the other servomotor is arranged between the two narrow belts. There is consequently redundancy with respect to the motors and the drives. Alternatively, both servomotors may be located on a common shaft and the belt drive is doubled.

In a further disclosed embodiment, one electrical servomotor is arranged on the steering column and the other electrical servomotor is arranged in the engine compartment. Electrical servomotors on the steering column in the passenger compartment of the vehicle are also referred to as column EPS systems. The electrical servomotor in the engine compartment is also fitted as a so-called single-pinion EPS and shares with the steering column a common steering pinion for the conversion of the rotary movement of the steering column into a translational movement of the gear rack. Alternatively, the servomotor in the engine compartment and the steering column may also have a steering pinion of their own in each case. In a further disclosed embodiment, the servomotor in the engine compartment and the steering column share a common steering pinion, whereas the servomotor on the steering column is coupled to the gear rack by way of a steering pinion of its own.

In a further disclosed embodiment, the two servomotors are formed as double motors which are arranged in a common housing, wherein permanent magnets are fixedly arranged, optionally adhesively bonded, on a common rotor shaft and the windings of the two servomotors are arranged alternately on the stator side. In addition, two motor angle sensors are fitted. As a result, many common parts that are considered not to be susceptible to faults are used. Only one steering pinion is required and the motor mounting can be retained as in the case of conventional steering systems with only one servomotor.

In FIG. 1, an electromechanical steering is schematically represented as part of a device 1 for assisting or automatic guiding of a motor vehicle. The device 1 comprises a first steering actuator 2 with an assigned steering control unit 3 and also a second steering actuator 4 with an assigned steering control unit 5. In this case, the first steering control unit 3 is connected to a first bus system 6 and the second steering control unit 5 is connected to a second bus system 7. Furthermore, the two steering control units 3, 5 are directly connected to one another by way of a further bus system (not represented for reasons of overall clarity). By way of the bus systems 6, 7, the steering control units 3, 5 receive setpoint values for the steering actuators 2, 4 from at least one high-level control unit for the assisting or automatic guiding of the motor vehicle. Similarly, actual values can be transmitted from the steering control units 3, 5 by way of the bus systems 6, 7 to the higher-level control unit. By way of the further bus system directly between the steering control units 3, 5, these can set up a redundant communication, in that for example setpoint values for the first steering control unit 3 are also transmitted by way of the second bus system 7 and the further bus system to the first steering control unit 3, so that the latter receives its setpoint values over two paths. This can be used for all transmissions of information, such as for example the setpoint values of the second steering control unit and also the actual values of the first and second steering actuators 2, 4. In the control units 3, 5, a setpoint steering angle α set is converted into an actual revolution U of a shaft 8, 9 of the respective steering actuator 2, 4. The steering actuators 2, 4 may be in this case formed as electrical servomotors. A motor pinion 10 is arranged on the shaft 8 and a motor pinion 11 is arranged on the shaft 9. Respective steering pinions 12, 13, which are in engagement with a gear rack 14, are connected to the respective motor pinions 10, 11. The gear rack 14 is held by way of bearings 15 and at its end has track rods 16, which are connected to swivel lever arms 17 of the swivel bearings that are connected to the wheels 18. Furthermore, connected to a steering column 20 is a steering handle 19, at the free end of which there is arranged a further steering pinion 21, which is likewise in engagement with the gear rack 14. Here, too, a conversion takes place between the steering angle α steering wheel and the revolution U of the steering column 20. In the event of a single fault of a steering actuator 2, 4 or its assigned elements, there is still half of the steering power available, so that the motor vehicle remains dependably controllable up until the time it is taken over by the driver of the motor vehicle.

Figure 2:
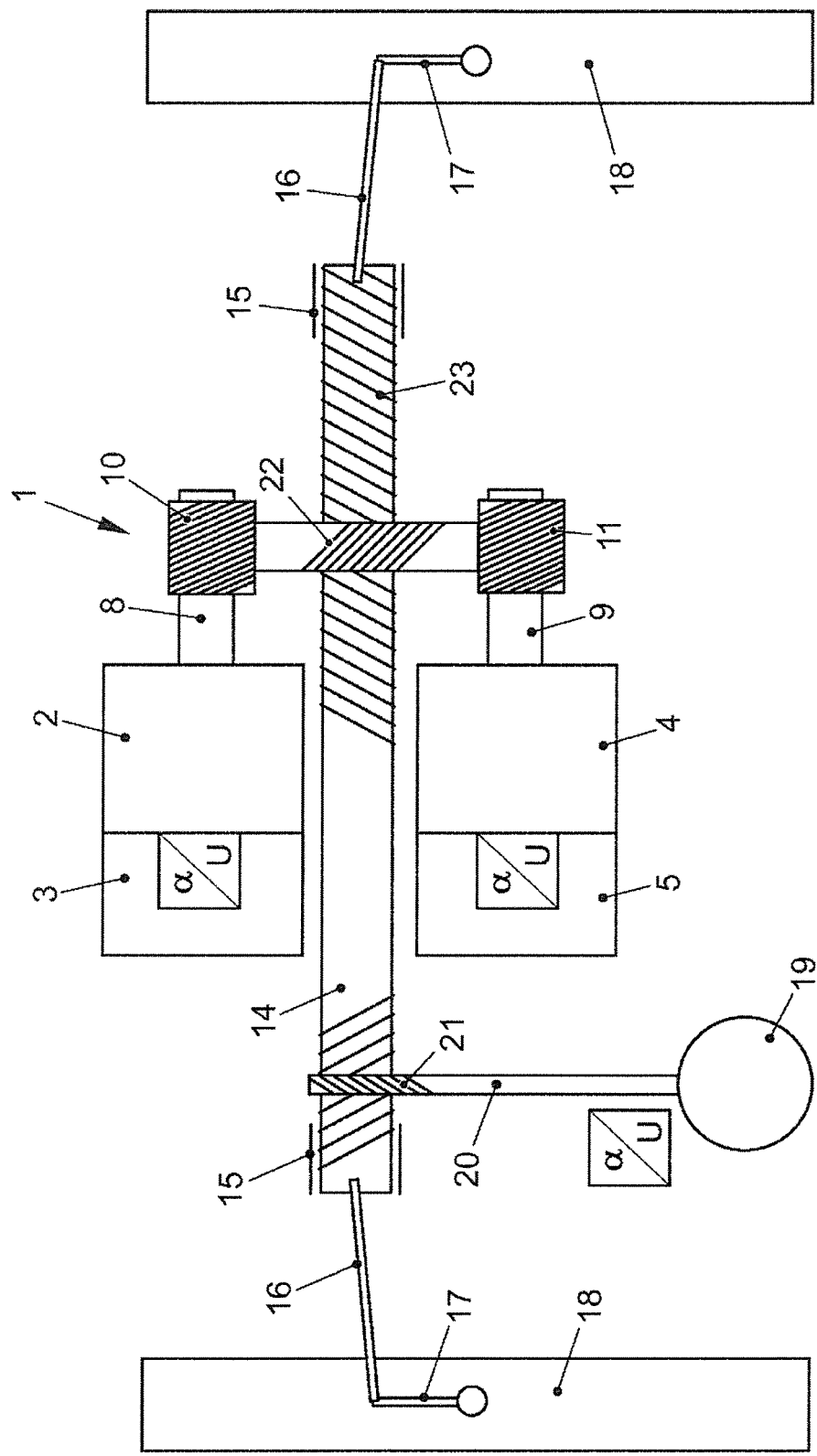
FIG. 2 shows an electromechanical steering with a common steering pinion in a first disclosed embodiment.

In FIG. 2, a disclosed embodiment is represented, wherein the same elements are provided with the same reference numerals, the bus systems 6, 7 no longer being represented in this and the other disclosed embodiments. The only difference from the disclosed embodiment according to FIG. 1 is that now the two motor pinions 10, 11 are connected to a common steering pinion 22, these motor pinions acting on different sides of the steering pinion 22. If it is assumed that the common steering pinion 22 is constructed similarly robustly as the gear rack 14, a steering pinion along with its mounting is saved in comparison with FIG. 1, the same applying with regard to single faults as stated in relation to FIG. 1. A further advantage is that a toothing 23 of the gear rack 14 does not have to be extended.

Figure 3:
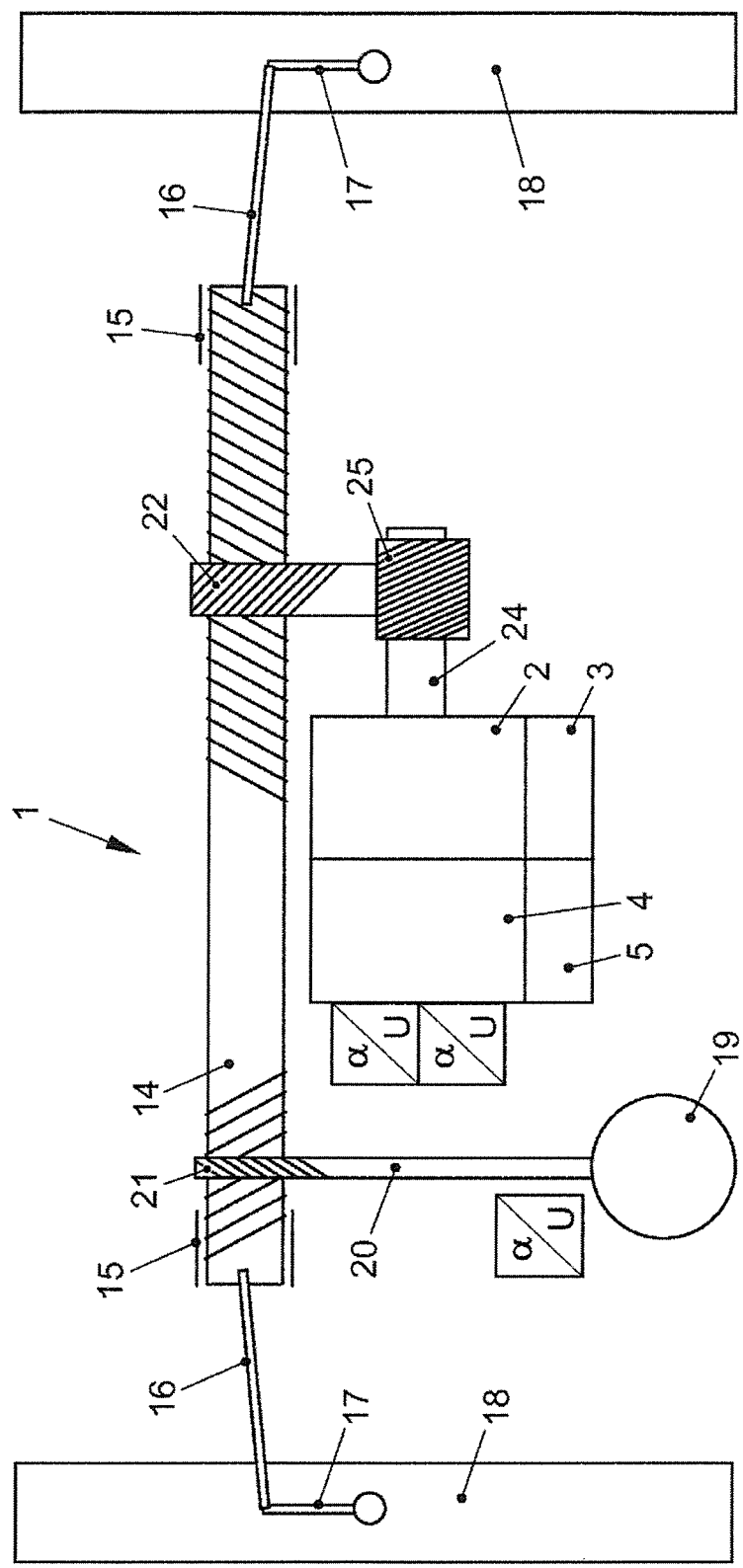
FIG. 3 shows an electromechanical steering with a common steering pinion for both servomotors in a second disclosed embodiment.

In FIG. 3, a further disclosed embodiment is represented, wherein the two steering actuators 2, 4 that are formed as servomotors are seated on a common shaft 24 with a motor pinion 25.

Figure 4:
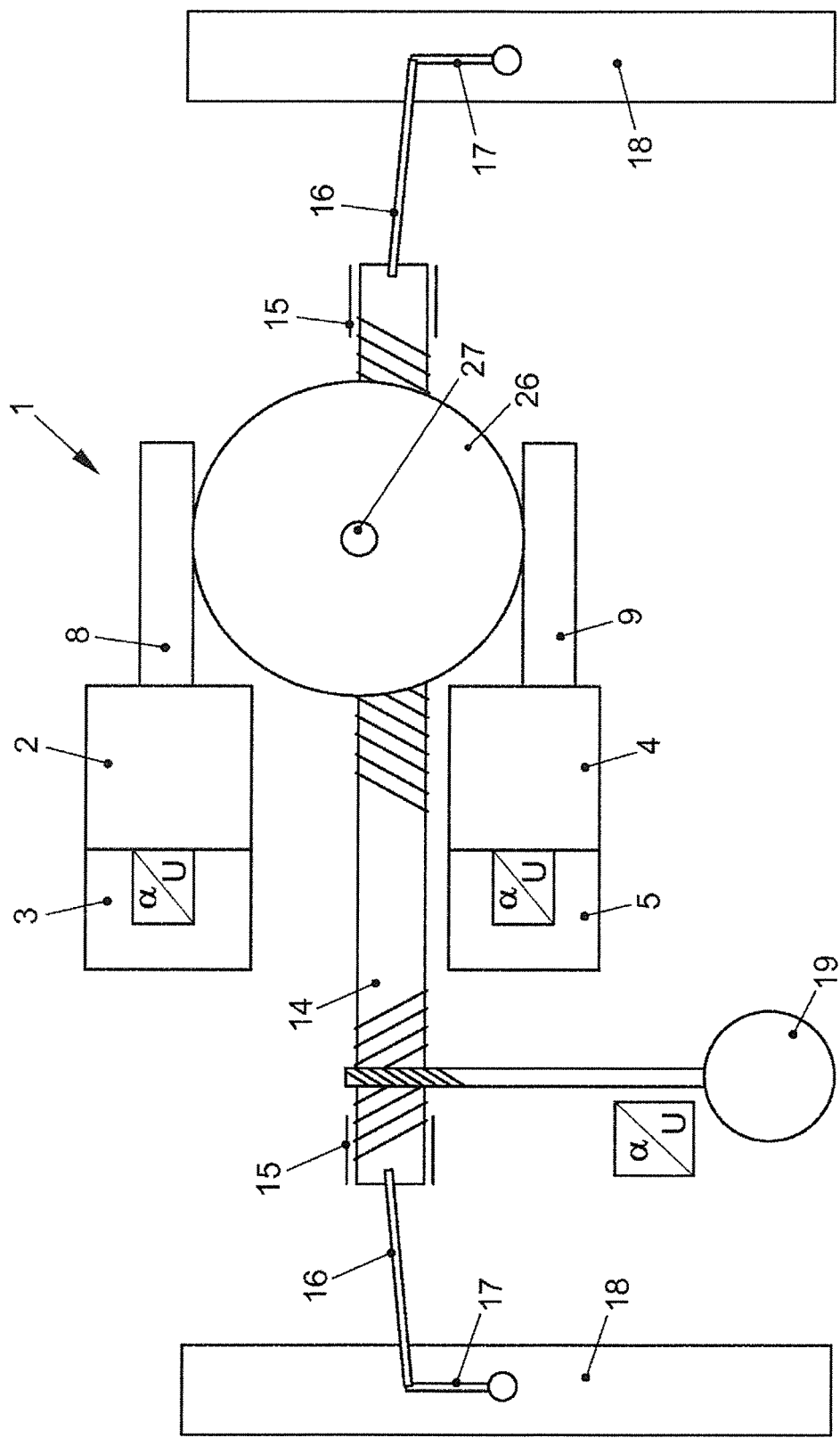
FIG. 4 shows an electromechanical steering with a common steering pinion for both servomotors in a third disclosed embodiment in a plan view.
Figure 5:
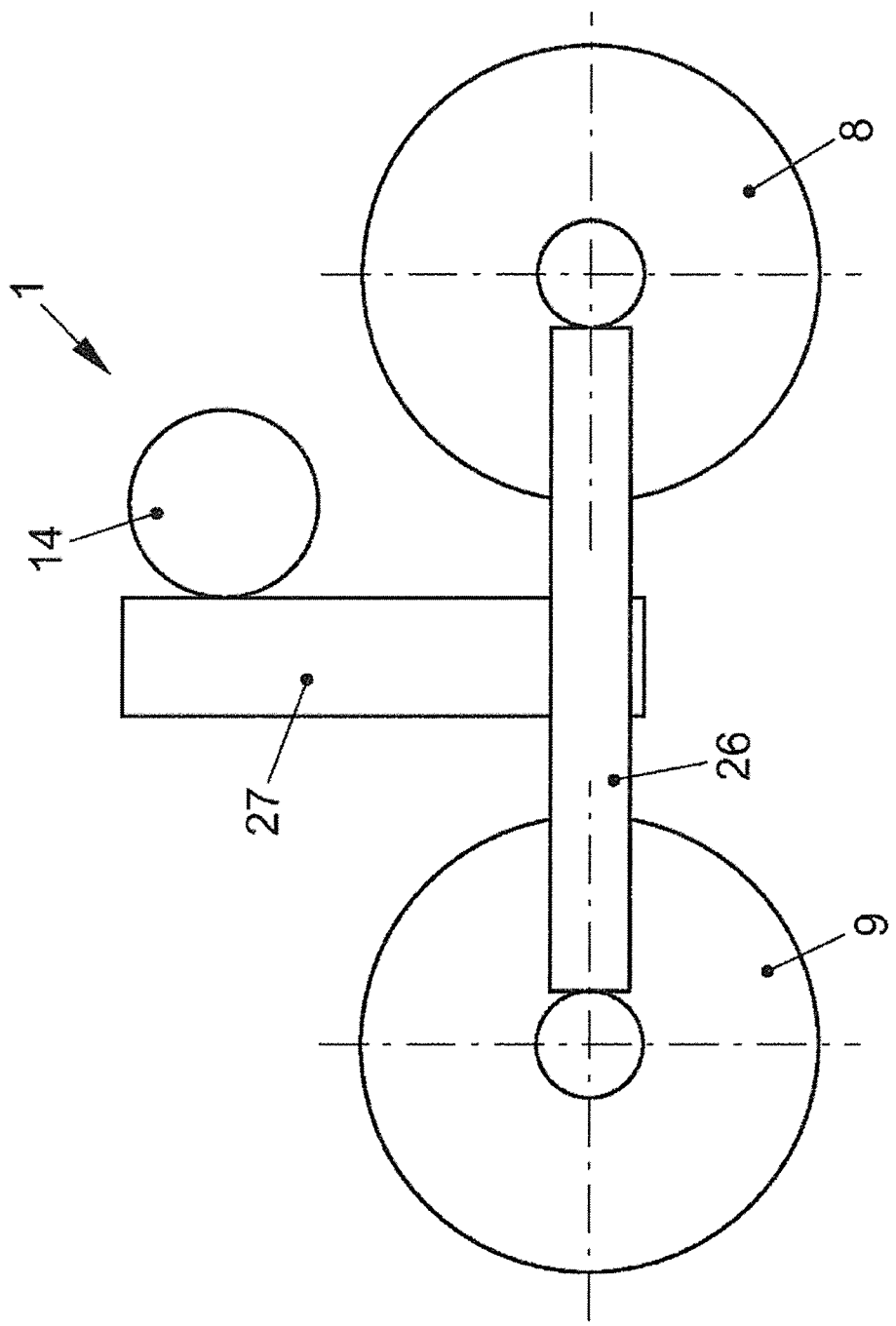
FIG. 5 shows the electromechanical steering according to FIG. 4 in a side view.

In FIGS. 4 and 5, a further disclosed embodiment is represented, wherein the two motor shafts 8, 9 are connected to the steering pinions 26, 27 by way of a screw gear. The steering pinion 27 is in engagement with the gear rack 14.

Figure 6:
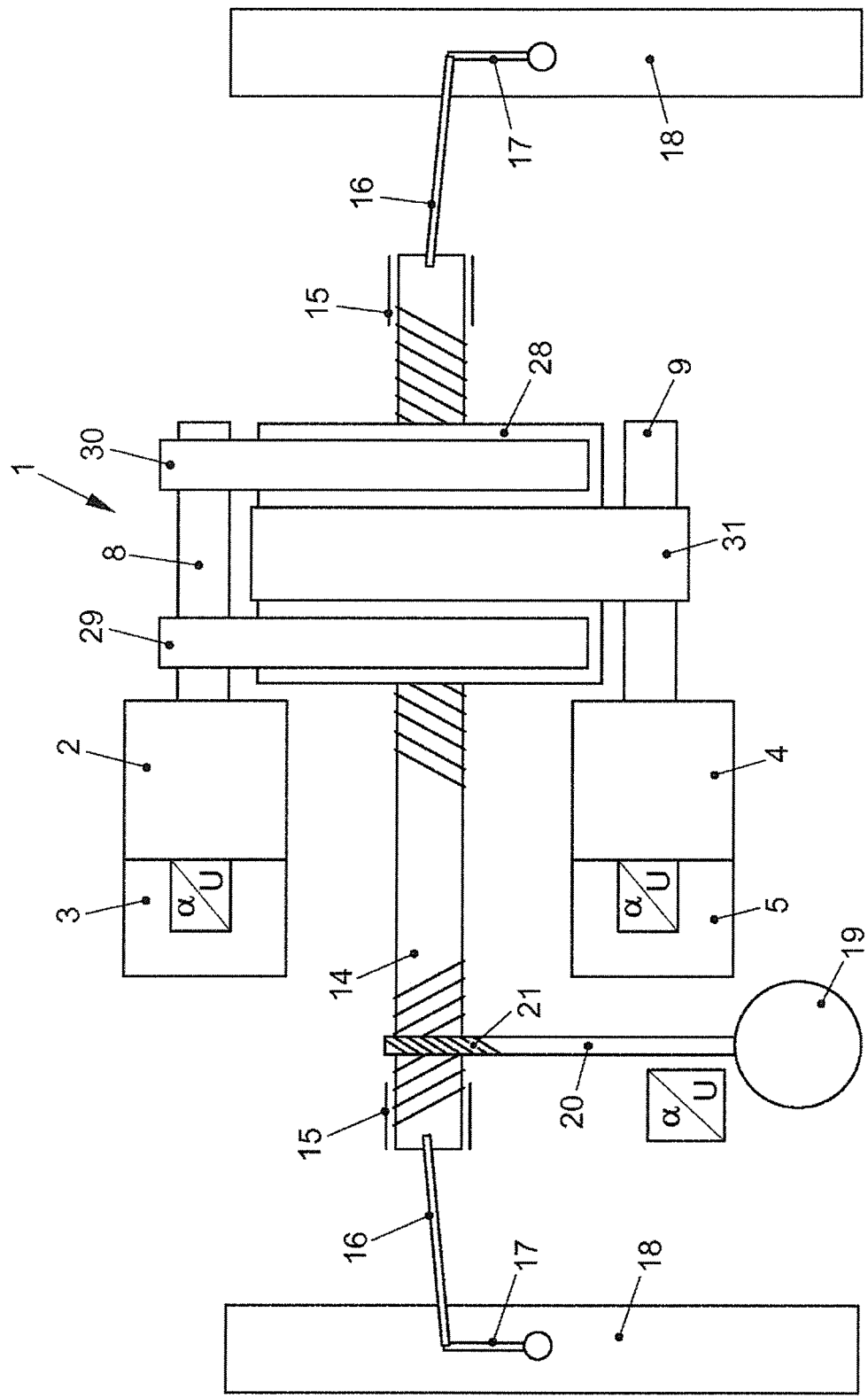
FIG. 6 shows an electromechanical steering with a common recirculating ball gear in a first disclosed embodiment.

In FIG. 6, a further disclosed embodiment is represented, wherein, in comparison with FIG. 2, the common steering pinion 22 has been replaced by a common recirculating ball gear 28 and the motor pinions 10, 11 are no longer needed. For reasons of symmetry, the shaft 8 of the first steering actuator 2 is connected to the recirculating ball gear 28 by two narrow outer belt drives 29, 30. The shaft 9 of the second steering actuator 4 is connected to the recirculating ball gear 28 by way of a wider central belt drive 31.

Figure 7:
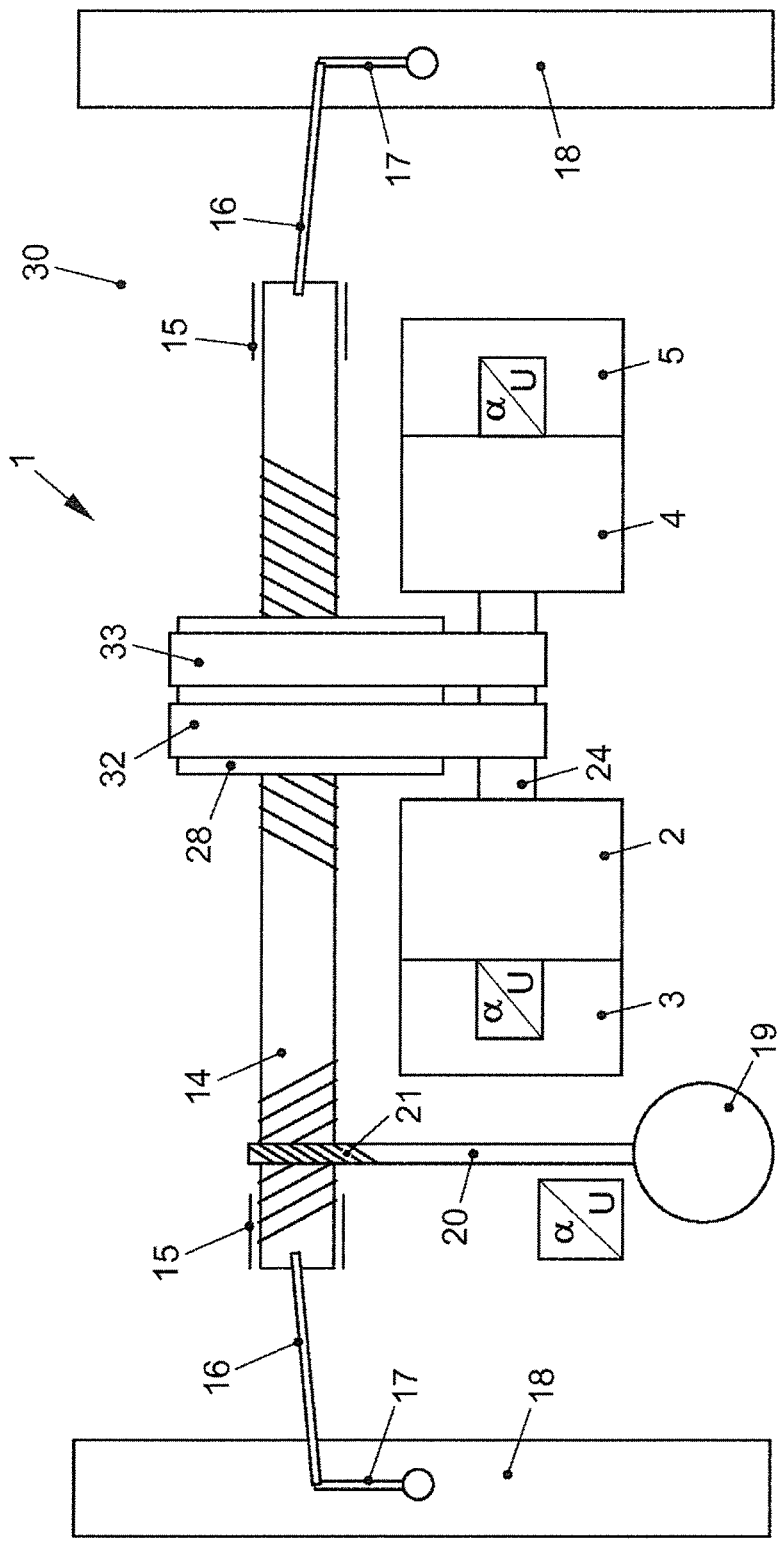
FIG. 7 shows an electromechanical steering with a common recirculating ball gear in a second disclosed embodiment.
Figure 8:
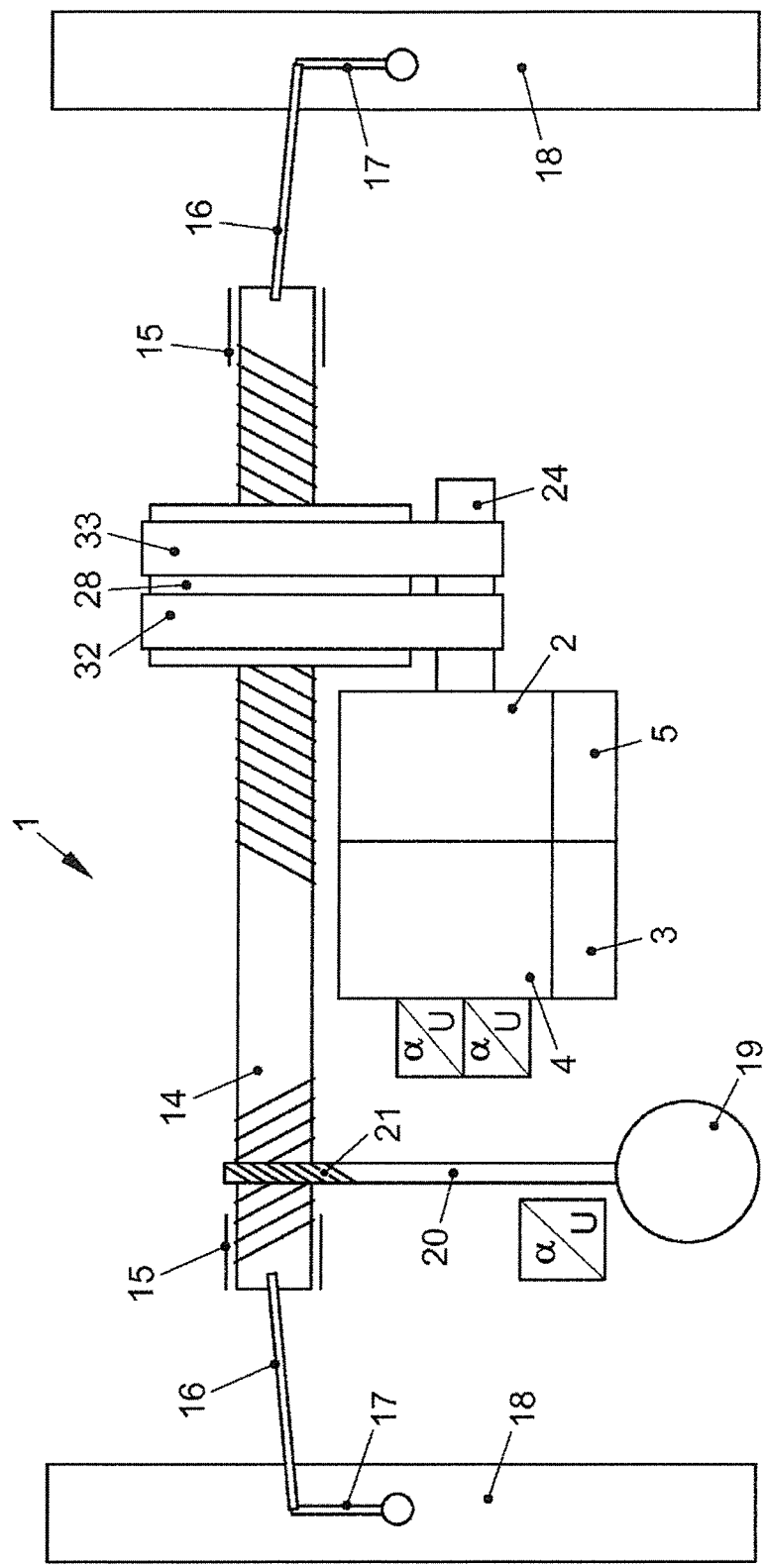
FIG. 8 shows an electromechanical steering with a common recirculating ball gear in a third disclosed embodiment.

In FIGS. 7 and 8, a disclosed embodiment with a recirculating ball gear 28 is represented, where the two steering actuators 2, 4 are respectively seated on a common shaft 24, which is connected to the recirculating ball gear 28 by way of a double belt drive 32, 33.

Figure 9:
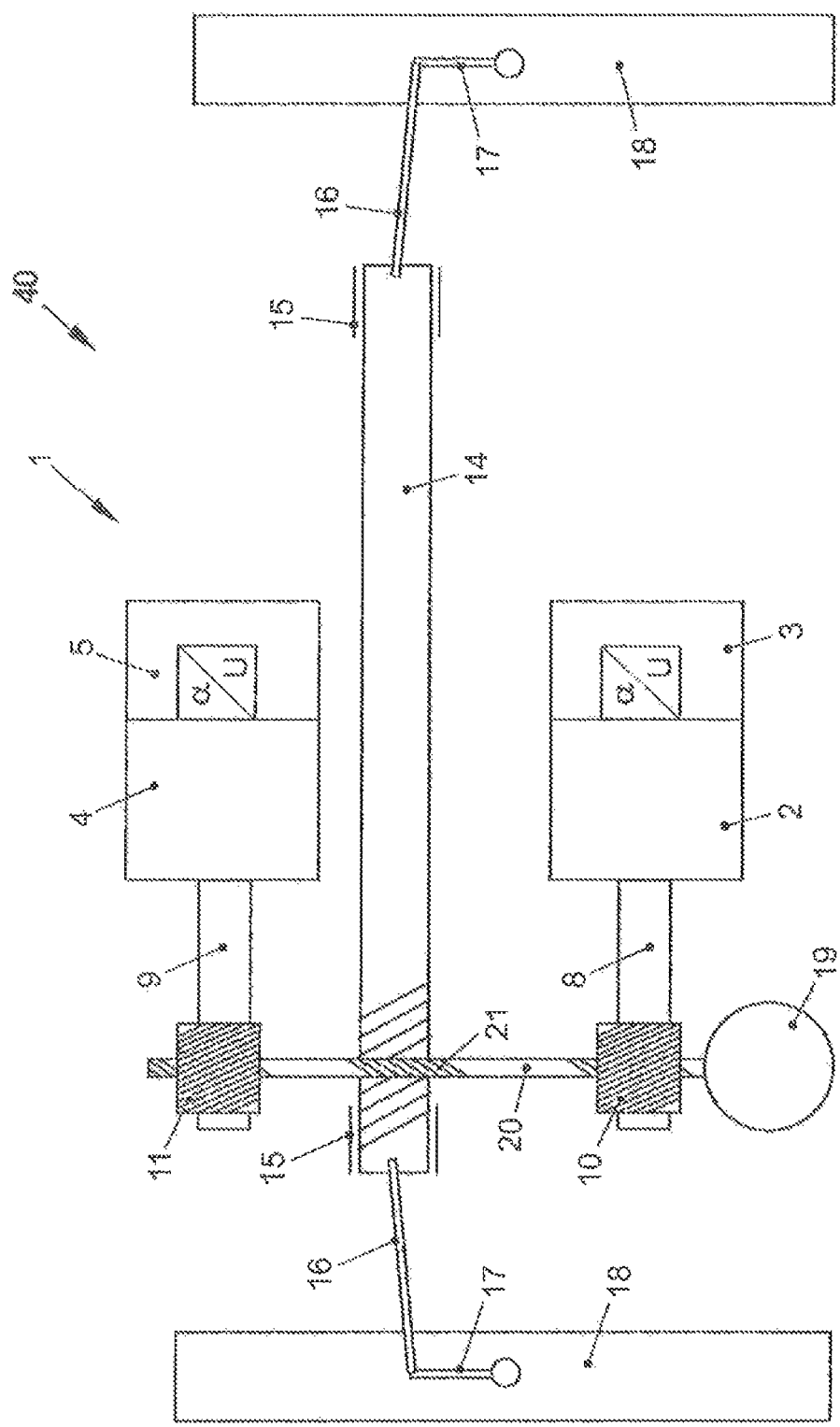
FIG. 9 shows an electromechanical steering with a servomotor on the steering column and a servomotor in the engine compartment in a first disclosed embodiment.

In FIG. 9, a further disclosed embodiment is represented, wherein the first steering actuator 2 is arranged on the steering column 20 and the second steering actuator 4 is arranged in the engine compartment 40. In this case, the motor pinion 10 acts on a toothing of the steering column 20, whereas the motor pinion 11 is connected to the steering pinion 21 of the steering column 20.

Figure 10:
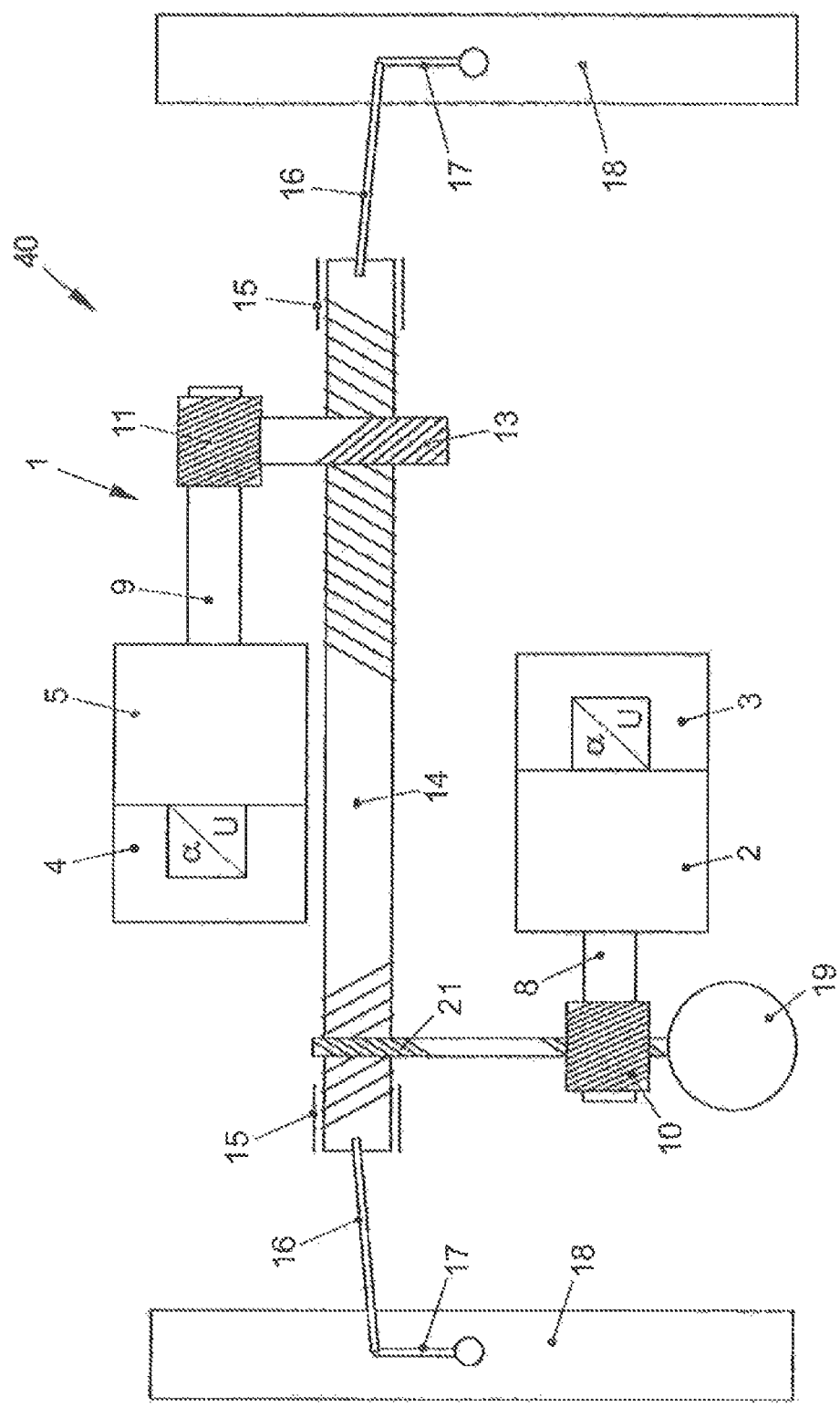
FIG. 10 shows an electromechanical steering with a servomotor on the steering column and a servomotor in the engine compartment in a second disclosed embodiment.

Alternatively, the motor pinion 11 may be connected to the gear rack 14 by way of a steering pinion 13 of its own, which is represented in FIG. 10.

Figure 11:
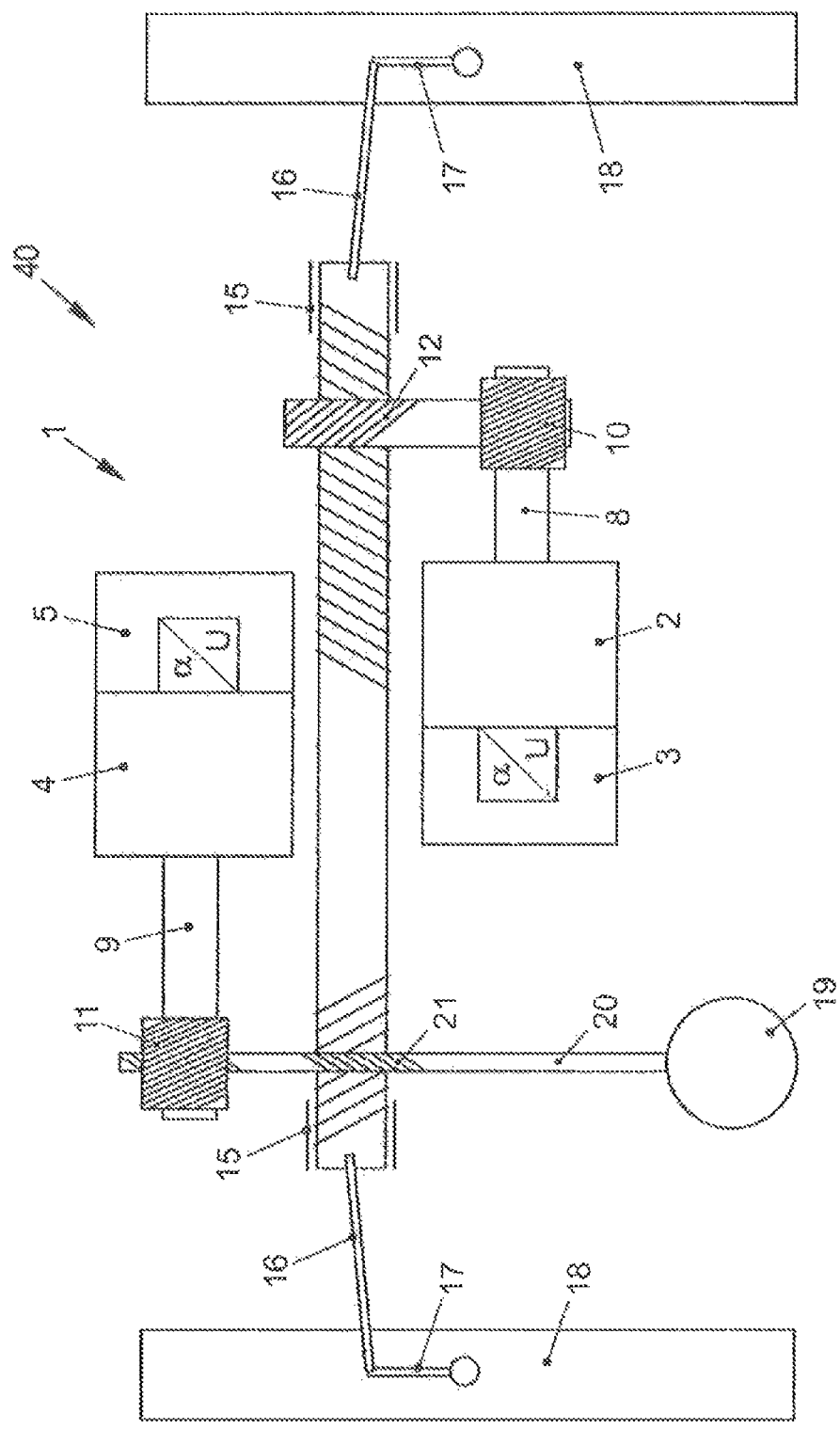
FIG. 11 shows an electromechanical steering with a servomotor on the steering column and a servomotor in the engine compartment in a third disclosed embodiment.

Finally, in FIG. 11, a further disclosed embodiment is represented, wherein the steering actuator 2 is connected to the gear rack 14 by way of a steering pinion 12 of its own, whereas the second steering actuator 4 acts with its motor pinion 11 on the common steering pinion 21 of the steering column 20.

Figure 12:
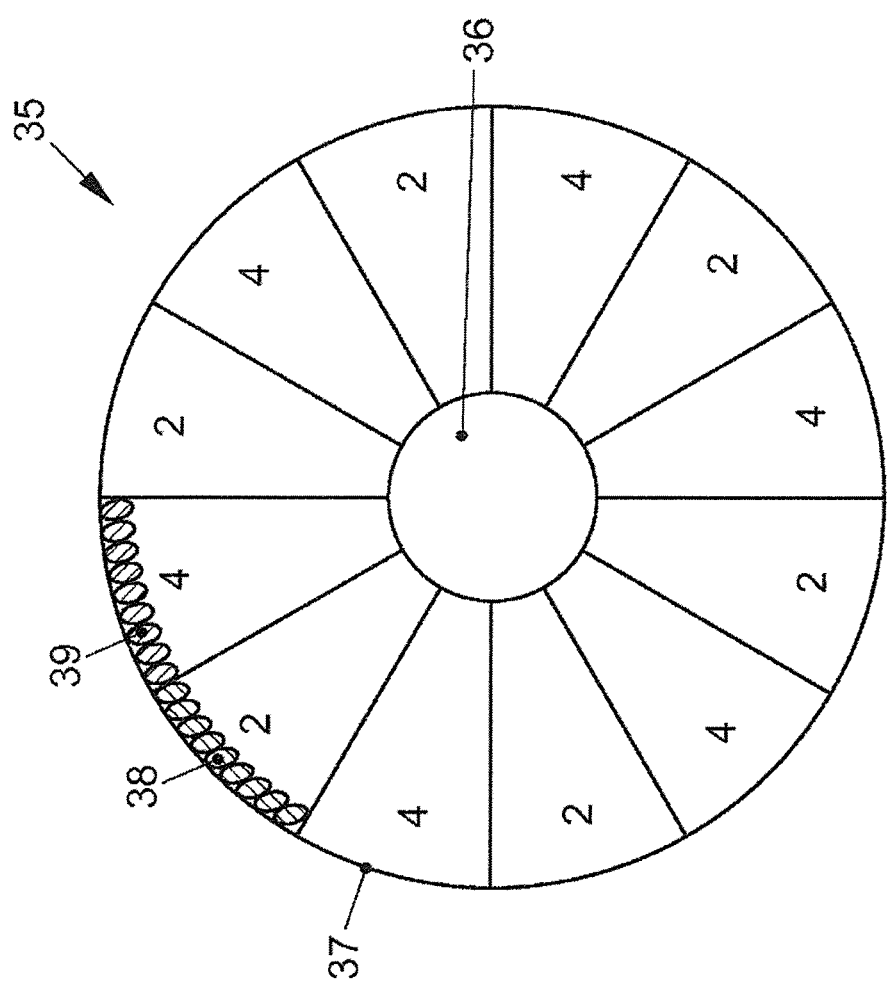
FIG. 12 shows a schematic representation of a double motor.

In FIG. 12, a double motor 35 is schematically represented. Permanent magnets that are not represented are adhesively bonded on a common rotor shaft 36, wherein the windings 38, 39 of the first steering actuator 2 and of the second steering actuator 4 are arranged in an alternating segmental manner on the stator 37, only the windings 38, 39 for one segment being respectively represented.

LIST OF REFERENCE NUMERALS

1 Device
2 Steering actuator
3 Steering control unit
4 Steering actuator
5 Steering control unit
6 Bus system
7 Bus system
8 Shaft
9 Shaft
10 Motor pinion
11 Motor pinion
12 Steering pinion
13 Steering pinion
14 Gear rack
15 Bearing
16 Track rod
17 Swivel lever arm
18 Wheels
19 Steering handle
20 Steering column
21 Steering pinion
22 Steering pinion
23 Toothing
24 Shaft
25 Motor pinion
26 Steering pinion
27 Steering pinion
28 Recirculating ball gear
29 Belt drive
30 Belt drive
31 Belt drive
32 Belt drive
33 Belt drive
35 Double motor
36 Rotor shaft
37 Stator
38 Winding
39 Winding

The invention claimed is:

1. A device for automated guiding of a transportation vehicle, the device comprising:
    a first steering actuator with an assigned steering control unit to provide automated guiding of the transportation vehicle;
    a gear rack;
    a steering column;
    a steering handle, the steering column and the first steering actuator having an effect on the gear rack;
    a second steering actuator with a further assigned steering control unit to provide automated guiding of the transportation vehicle, the second steering actuator having an effect on the gear rack, and
    a higher-level control unit arranged in communication with each of the assigned steering control unit of the first steering actuator and the further assigned steering control unit of the second steering actuator to communicate setpoint values,
    wherein the assigned steering control unit and the further assigned steering control unit are arranged in communication with each other to provide setpoint values from at least one of the assigned steering control units to the other under fault conditions.

2. The device of claim 1, wherein the fault conditions include fault of a bus system providing communication between the higher-level control unit and the one of the assigned steering control units.

3. The device of claim 1, wherein the two steering actuators are formed as electrical servomotors which are connected to electrical energy supply units that are independent of one another.

4. The device of claim 3, wherein the two electrical servomotors are connected to the gear rack by a steering pinion of their own in each case.

5. The device of claim 3, wherein the two electrical servomotors are connected to the gear rack by a common steering pinion.

6. The device of claim 5, wherein the two servomotors act on different sides of the common steering pinion.

7. The device of claim 5, wherein the two servomotors are seated on a common shaft.

8. The device of claim 3, wherein the two servomotors are connected to the gear rack by a recirculating ball gear with a belt drive.

9. The device of claim 3, wherein the shafts of the servomotors are connected to a common intermediate gear with steering pinions, the steering pinion is connected to the gear rack.

10. The device of claim 3, wherein one electrical servomotor is arranged on the steering column and the other electrical servomotor is arranged in an engine compartment.

11. The device of claim 7, wherein the two servomotors are formed as double motors arranged in a common housing, wherein permanent magnets are fixedly arranged on a common rotor shaft and the windings of the two servomotors are arranged alternately on the stator.

12. The device of claim 1, wherein automated guidance of the transportation vehicle includes operation of at least one of the first and second actuators to act on the gear rack with no driver-provided guidance.

13. A vehicle for automated guidance, the vehicle comprising:
   a first steering actuator with an assigned steering control unit;
   a gear rack;
   a steering column coupled with the gear rack to guide the vehicle responsive to user input; and
   at least one second steering actuator with a further assigned steering control unit, and
   a higher-level control unit arranged in communication with each of the assigned steering control unit of the first steering actuator and the further assigned steering control unit of the second steering actuator to communicate setpoint values,
   wherein the first steering actuator and the second steering actuator are each adapted to act on the gear rack according to the respective assigned steering control unit to provide partially, highly, or fully automated guidance of the transportation vehicle according to setpoint values communicated with the higher-level control unit,
   wherein the assigned steering control unit and the further assigned steering control unit are arranged in communication with each other to provide setpoint values from at least one to the other under fault conditions.

14. The vehicle of claim 13, wherein the fault conditions include fault of a bus system providing communication between the higher-level control unit and the one of the assigned steering control units.

15. The vehicle of claim 13, wherein the two steering actuators are formed as electrical servomotors which are connected to electrical energy supply units that are independent of one another.

16. The vehicle of claim 15, wherein the two electrical servomotors are connected to the gear rack by a steering pinion of their own in each case.

17. The vehicle of claim 15, wherein one electrical servomotor is arranged on the steering column and the other electrical servomotor is arranged in an engine compartment.

18. The vehicle of claim 13, wherein automated guiding of the transportation vehicle includes operation of at least one of the first and second actuators to act on the gear rack with no driver-provided guidance.

* * * * *